(12) United States Patent
Maruyama et al.

(10) Patent No.: US 11,614,843 B2
(45) Date of Patent: Mar. 28, 2023

(54) TOUCH PANEL AND DISPLAY DEVICE

(71) Applicant: SHARP KABUSHIKI KAISHA, Sakai (JP)

(72) Inventors: Takenori Maruyama, Sakai (JP); Kazutoshi Kida, Sakai (JP); Shinji Yamagishi, Sakai (JP); Takuma Yamamoto, Sakai (JP); Yasuhiro Sugita, Sakai (JP); Hiroshi Fukushima, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 2 days.

(21) Appl. No.: 17/369,897

(22) Filed: Jul. 7, 2021

(65) Prior Publication Data
US 2022/0050555 A1    Feb. 17, 2022

(30) Foreign Application Priority Data
Aug. 17, 2020   (JP) .............................. JP2020-137472

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01); *G06F 3/04164* (2019.05)

(58) Field of Classification Search
CPC ... G06F 3/0446; G06F 3/04164; G06F 3/0412
See application file for complete search history.

(56) References Cited

U.S. PATENT DOCUMENTS

| | | | |
|---|---|---|---|
| 2014/0062933 A1 | 3/2014 | Coulson et al. | |
| 2015/0212633 A1* | 7/2015 | Yamagishi | G06F 3/045 345/174 |
| 2016/0187690 A1 | 6/2016 | Nam et al. | |
| 2018/0129330 A1* | 5/2018 | Ding | G06F 3/0443 |
| 2022/0164060 A1* | 5/2022 | Yamamoto | G06F 3/0446 |

FOREIGN PATENT DOCUMENTS

JP    2016-126336 A    7/2016

* cited by examiner

*Primary Examiner* — Peter D McLoone
(74) *Attorney, Agent, or Firm* — ScienBiziP, P.C.

(57) ABSTRACT

A touch panel includes a first substrate and a second substrate. The touch panel includes a drive electrode formed on a surface of the first substrate, a position sensor electrode and a pressing force sensor electrode formed on a surface of the second substrate, a position sensor wiring line that connects the position sensor electrode to a terminal portion, a pressing force sensor wiring line that connects the pressing force sensor electrode to the terminal portion, and a shield wiring line disposed between the position sensor wiring line and the pressing force sensor wiring line in a plan view.

20 Claims, 21 Drawing Sheets

TOUCH PANEL AND DISPLAY DEVICE

CROSS-REFERENCE TO RELATED APPLICATIONS

This application claims the benefit of priority to Japanese Patent Application Number 2020-137472 filed on Aug. 17, 2020. The entire contents of the above-identified application are hereby incorporated by reference.

BACKGROUND

Technical Field

The disclosure relates to a touch panel that detects a position of a pointer, such as a finger or a touch pen, and a magnitude of a pressing force by the pointer, and to a display device provided with the touch panel.

In recent years, mutual-capacitive touch panels have been in wide use. The mutual-capacitive touch panel includes a drive electrode to which a drive signal is input, and a position sensor electrode. In this touch panel, as a result of a pointer being capacitively coupled with each of the drive electrode and the position sensor electrode, electrostatic capacitance between both the electrodes decreases, and a signal of the position sensor electrode changes. The signal of the position sensor electrode is transmitted to a controller via a position sensor wiring line connected to the position sensor electrode, and via a terminal portion connected to the position sensor wiring line. The controller detects a position of the pointer based on a change in the signal of the position sensor electrode.

Further, in US 2014/0062933 A, a touch panel is proposed in which not only the position of the pointer but also a magnitude of a pressing force can be detected. This touch panel is provided with a pressing force sensor electrode for detecting the magnitude of the pressing force by the pointer, as well as a position sensor electrode for detecting the position of the pointer. Furthermore, the position sensor electrode and the pressing force sensor electrode are formed on the same surface, and a drive electrode is formed on a surface facing the position sensor electrode and the pressing force sensor electrode. Then, in this touch panel, when a distance between the drive electrode and the pressing force sensor electrode is reduced as a result of being pressed by the pointer, electrostatic capacitance between these electrodes increases, and a signal of the pressing force sensor electrode changes. The signal of the pressing force sensor electrode is transmitted to a controller via a pressing force sensor wiring line connected to the pressing force sensor electrode, and via a terminal portion connected to the pressing force sensor wiring line. The controller detects the magnitude of the pressing force based on the change in the signal of the pressing force sensor electrode.

SUMMARY

In such a touch panel as described in US 2014/0062933 A, since the position sensor wiring line and the pressing force sensor wiring line are formed on the same surface, the position sensor wiring line and the pressing force sensor wiring line are disposed adjacent to each other. In this case, it is considered that, as a result of the position sensor wiring line and the pressing force sensor wiring line being capacitively coupled, the change in the signal of the pressing force sensor electrode may affect the signal of the position sensor electrode, or the change in the signal of the position sensor electrode may affect the signal of the pressing force sensor electrode. As a result, the change in the signal of the position sensor electrode changes the signal of the pressing force sensor electrode, and the detection accuracy of the magnitude of the pressing force by the pointer decreases. Further, the change in the signal of the pressing force sensor electrode changes the signal of the position sensor electrode, and the detection accuracy of the position of the pointer decreases.

Thus, the disclosure provides a touch panel capable of accurately detecting a position of a pointer and a magnitude of a pressing force by the pointer, and a display device provided with the touch panel.

To solve the above-described problems, a touch panel according to an embodiment of the disclosure includes a first substrate including a first surface, a second substrate including a second surface facing the first surface, a drive electrode formed on the first surface, a position sensor electrode and a pressing force sensor electrode formed on the second surface, a position sensor wiring line configured to connect the position sensor electrode to a sensor terminal portion, a pressing force sensor wiring line configured to connect the pressing force sensor electrode to the sensor terminal portion, and a shield wiring line disposed between the position sensor wiring line and the pressing force sensor wiring line in a plan view of the second substrate.

By including the shield wiring line, the touch panel having the above-described configuration can inhibit capacitive coupling between the position sensor wiring line and the pressing force sensor wiring line. As a result, since the capacitive coupling, which causes a deterioration in the detection accuracy of a position of a pointer and a magnitude of a pressing force by the pointer, can be inhibited, the position of the pointer and the magnitude of the pressing force by the pointer can be accurately detected. Further, a display device provided with the touch panel having the above-described configuration can accurately detect the position of the pointer and the magnitude of the pressing force by the pointer.

BRIEF DESCRIPTION OF DRAWINGS

The disclosure will be described with reference to the accompanying drawings, wherein like numbers reference like elements.

DESCRIPTION OF EMBODIMENTS

Figure 1:
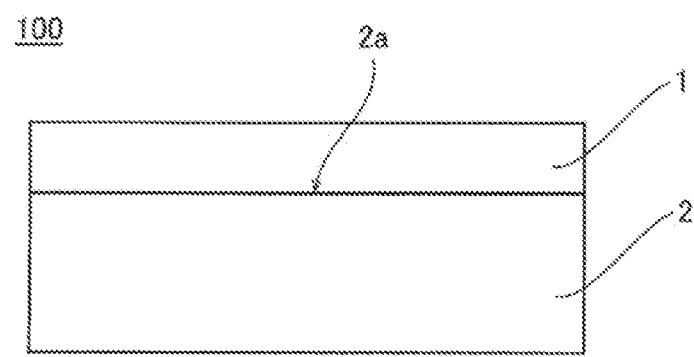
FIG. 1 is a cross-sectional view schematically illustrating a configuration of a display device according to a first embodiment.

Hereinafter, embodiments of the disclosure will be described in detail with reference to the drawings. In the drawings, identical or corresponding parts are denoted by the same reference signs, and the description thereof will not be repeated. Note that, for ease of description, in the drawings referred to below, the configuration may be simplified or schematically illustrated, or some of the components may be omitted. Further, the dimensional ratios between the components illustrated in the drawings are not necessarily indicative of actual dimensional ratios. Further, in the drawings referred to below, various electrodes are displayed with hatching in order to facilitate the identification of various electrodes.

First Embodiment

Configuration of Display Device

FIG. 1 is a cross-sectional view illustrating an overall configuration of a display device 100 according to a first embodiment. The display device 100 includes a touch panel 1 and a display portion 2 that displays an image on a display surface 2a. The display portion 2 may be configured by a liquid crystal display or an organic electroluminescent (EL) display, for example. FIG. 1 illustrates an example of an out-cell touch panel in which the display portion 2 is disposed outside of the touch panel 1, but the disclosure is not limited to this example. In other words, the disclosure may be configured as a full-in-cell touch panel, or may be configured as a semi-in-cell touch panel.

Configuration of Touch Panel

Figure 2:
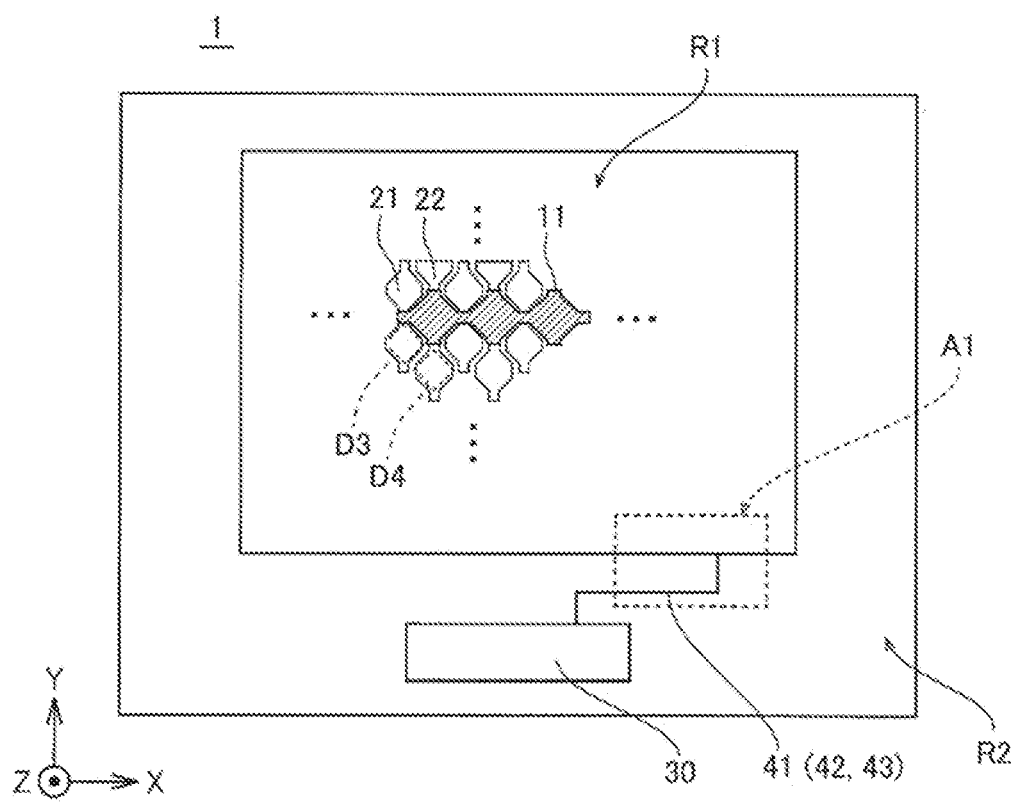
FIG. 2 is a plan view illustrating a configuration of a touch panel according to the first embodiment.

FIG. 2 is a plan view schematically illustrating a configuration of the touch panel 1 according to the first embodiment. The touch panel 1 includes a sensor active region R1 and a wiring line lead region R2. The sensor active region R1 is a region for detecting a position touched by a pointer and a position pressed by the pointer in the touch panel 1. A plurality of drive electrodes 11, a plurality of position sensor electrodes 21, and a plurality of pressing force sensor electrodes 22 are provided in the sensor active region R1. Further, position sensor wiring lines 41, which are wiring lines connecting the position sensor electrodes 21 to a terminal portion 30, and pressing force sensor wiring lines 42, which are wiring lines connecting the pressing force sensor electrodes 22 to the terminal portion 30, are provided in the wiring line lead region R2. Further, in the present embodiment, shield wiring lines 43 are provided in the wiring line lead region R2.

Figure 3:
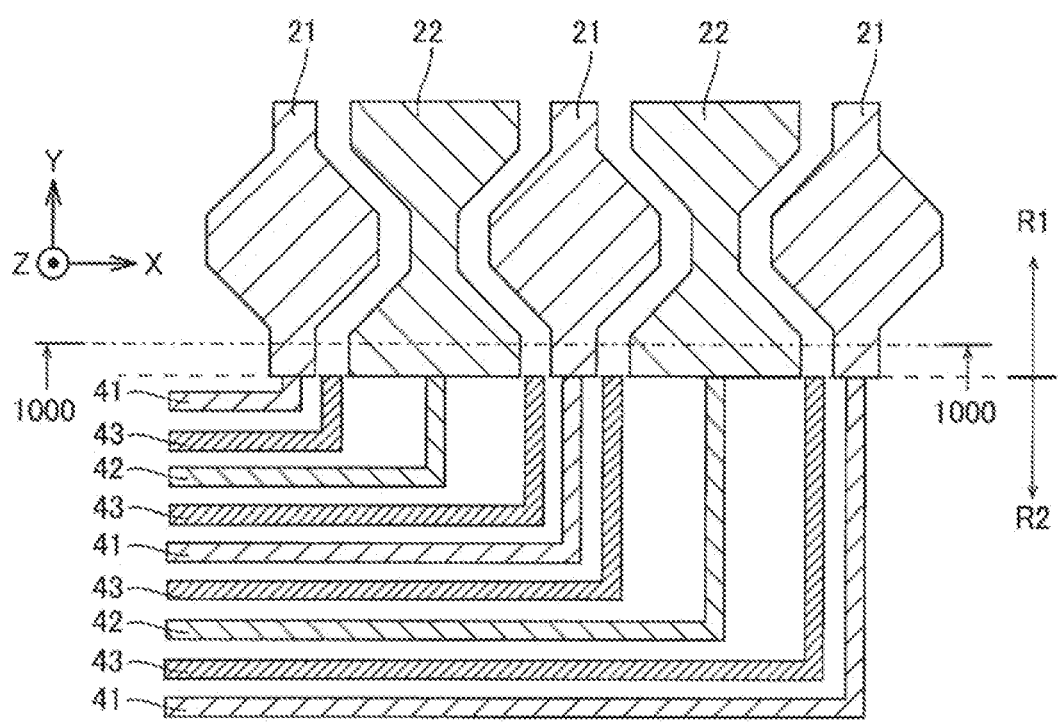
FIG. 3 is a partially enlarged view of a region A1 in FIG. 2.
Figure 4:
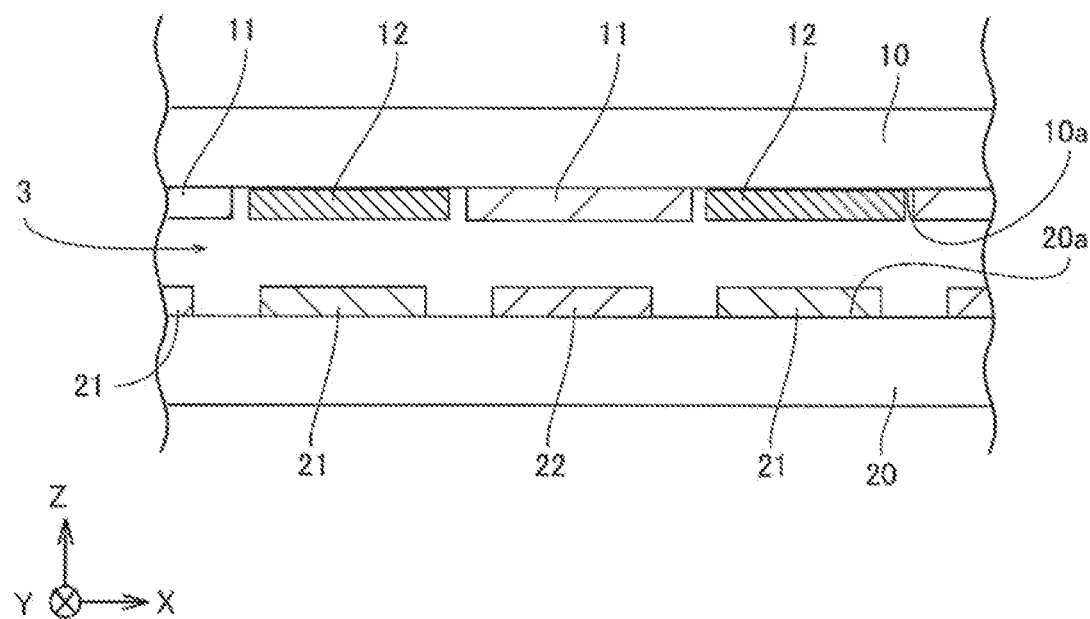
FIG. 4 is a cross-sectional view taken along the line 1000-1000 in FIG. 3.

FIG. 3 is a partially enlarged view of the touch panel 1 (a region A1 surrounded by dotted lines) in FIG. 2. FIG. 4 is a cross-sectional view taken along the line 1000-1000 in FIG. 3. As illustrated in FIG. 4, the touch panel 1 includes a first substrate 10, a pressure sensitive layer 3, and a second substrate 20. The first substrate 10, the pressure sensitive layer 3, and the second substrate 20 are layered in this order from the positive direction side in a Z-direction. For example, the first substrate 10 and the second substrate 20 are each made of a transparent material such as glass. Further, the pressure sensitive layer 3 is made of a transparent material having elasticity, such as a polymer material, a piezoelectric element, or the like.

Configuration of Sensor Active Region

Figure 5:
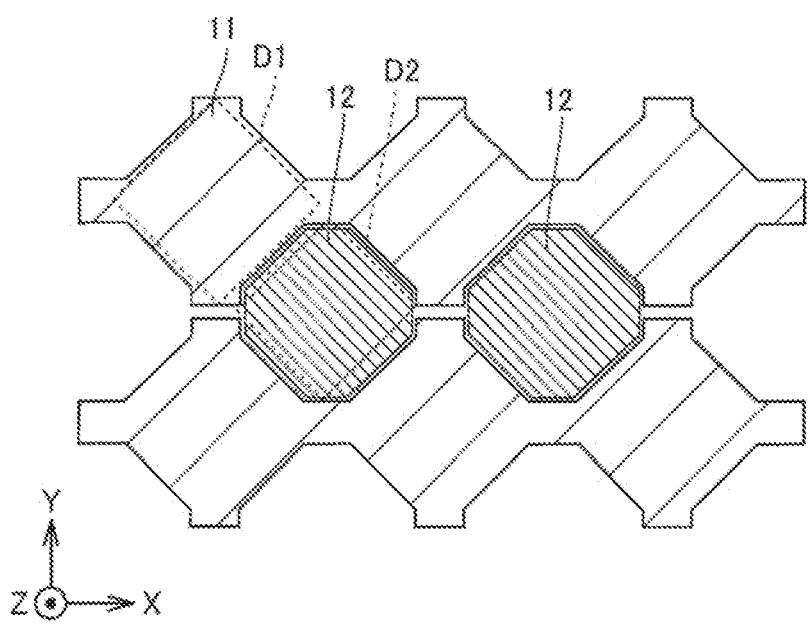
FIG. 5 is a plan view illustrating a configuration of a drive electrode and a floating island electrode according to the first embodiment.

FIG. 5 is a schematic plan view of the drive electrodes 11 and floating island electrodes 12. The drive electrodes 11 and the floating island electrodes 12 are formed on a surface 10a, on the second substrate 20 side, of the first substrate 10, in the sensor active region R1 of the touch panel 1. Further, the position sensor electrodes 21 and the pressing force sensor electrodes 22 are formed on a surface 20a, of the second substrate 20, facing the surface 10a, in the sensor active region R1 of the touch panel 1. Further, the drive electrode 11, the floating island electrode 12, the position sensor electrode 21, and the pressing force sensor electrode 22 are each made of an electrically conductive transparent material such as indium tin oxide (ITO). The drive electrode 11 is an electrode to which a drive signal is supplied. The floating island electrode 12 is formed on the surface 10a of the first substrate 10, and is electrically in a floating state. The position sensor electrode 21 is an electrode for detecting a position of the pointer. The pressing force sensor electrode 22 is an electrode for detecting a magnitude of pressing force by the pointer.

As illustrated in FIG. 5, the drive electrode 11 has a shape (a diamond pattern) in which a plurality of rhombus-shaped electrodes D1 are connected to each other in a diagonal direction (an X-direction) thereof. The floating island electrodes 12 are configured by a plurality of rhombus-shaped electrodes D2, which are not connected to each other. Further, as illustrated in FIG. 2, the position sensor electrode 21 has a diamond pattern in which a plurality of rhombus-shaped electrodes D3 are connected to each other. Further, the pressing force sensor electrode 22 has a diamond pattern in which a plurality of rhombus-shaped electrodes D4 are connected to each other. A connection direction in which the rhombus-shaped electrodes D3 of the position sensor electrode 21 are connected to each other (a Y-direction), and a connection direction in which the rhombus-shaped electrodes D4 of the pressing force sensor electrode 22 are connected to each other (the Y-direction) are parallel to each other, and the position sensor electrodes 21 and the pressing force sensor electrodes 22 are alternately disposed with respect to a direction perpendicular to the connection directions (the X-direction). Meanwhile, the drive electrode 11 is disposed such that a connection direction of the rhombus-shaped electrodes D1 (the X-direction) is perpendicular to the respective connection directions of the rhombus-shaped electrodes D3 and D4 (the Y-direction) of the position sensor electrode 21 and the pressing force sensor electrode 22.

Further, as illustrated in FIG. 2 and FIG. 5, the drive electrode 11 covers at least a portion of the pressing force sensor electrode 22. In a plan view in which the second substrate 20 is viewed from the first substrate 10 in the Z-direction (hereinafter simply referred to as a "plan view"), the floating island electrode 12 covers at least a portion of the position sensor electrode 21.

Configuration of Wiring Line Lead Region

As illustrated in FIG. 3, in the present embodiment, the position sensor wiring lines 41, the pressing force sensor wiring lines 42, and the shield wiring lines 43 are formed on the surface 20a of the second substrate 20, in the wiring line lead region R2 of the touch panel 1. Further, the position sensor wiring line 41 and the pressing force sensor wiring line 42 may each be constituted by the same material as the material of the position sensor electrode 21 and the pressing force sensor electrode 22 (ITO, for example), or may be constituted of mesh metal, for example. Note that the mesh metal is a metal thin wire having a mesh shape. The shield wiring line 43 is made of ITO or mesh metal, for example. The shield wiring line 43 may be constituted by the same material as that of the position sensor wiring line 41 and the pressing force sensor wiring line 42.

The position sensor wiring line 41 is connected to the terminal portion 30 (see FIG. 2) and has a function of transmitting a signal output from the position sensor electrode 21 to the terminal portion 30. Further, the pressing force sensor wiring line 42 is connected to the terminal portion 30 (see FIG. 2) and has a function of transmitting a signal output from the pressing force sensor electrode 22 to the terminal portion 30. A ground potential or a potential equal to a potential of the position sensor wiring line 41 or the pressing force sensor wiring line 42 is supplied to the shield wiring line 43, or the shield wiring line 43 is in a floating state. The shield wiring line 43 has a function of inhibiting capacitive coupling between the position sensor wiring line 41 and the pressing force sensor wiring line 42. According to this configuration, as a result of the configuration including the shield wiring line 43, it is possible to inhibit capacitive coupling between the position sensor wiring line 41 and the pressing force sensor wiring line 42, which causes a deterioration in the detection accuracy of the position of a pointer F and of a magnitude of a pressing force by the pointer F. Accordingly, the touch panel 1 can accurately detect the position of the pointer F and the magnitude of the pressing force by the pointer F. The effect of being able to inhibit the capacitive coupling between the position sensor wiring line 41 and the pressing force sensor wiring line 42 is already verified by a comparison result between a comparative example (to be described below) and the first embodiment.

The position sensor wiring line 41 and the pressing force sensor wiring line 42 are respectively connected to one end (the negative side end in the Y-direction) of the position sensor electrode 21 provided in the sensor active region R1, and to one end (the negative side end in the Y-direction) of the pressing force sensor electrode 22 provided in the sensor active region R1. Each of the position sensor wiring line 41, the pressing force sensor wiring line 42, and the shield wiring line 43 is formed into an L-shape in a plan view by a portion extending from the sensor active region R1 in the negative direction in the Y-direction, and a portion extending to the negative side in the X-direction toward the terminal portion 30 from a lower end of the portion extending to the negative side.

The position sensor wiring lines 41 and the pressing force sensor wiring lines 42 are alternately disposed side by side in a plan view. Then, the shield wiring line 43 is disposed between the position sensor wiring line 41 and the pressing force sensor wiring line 42 in a plan view.

Figure 6:
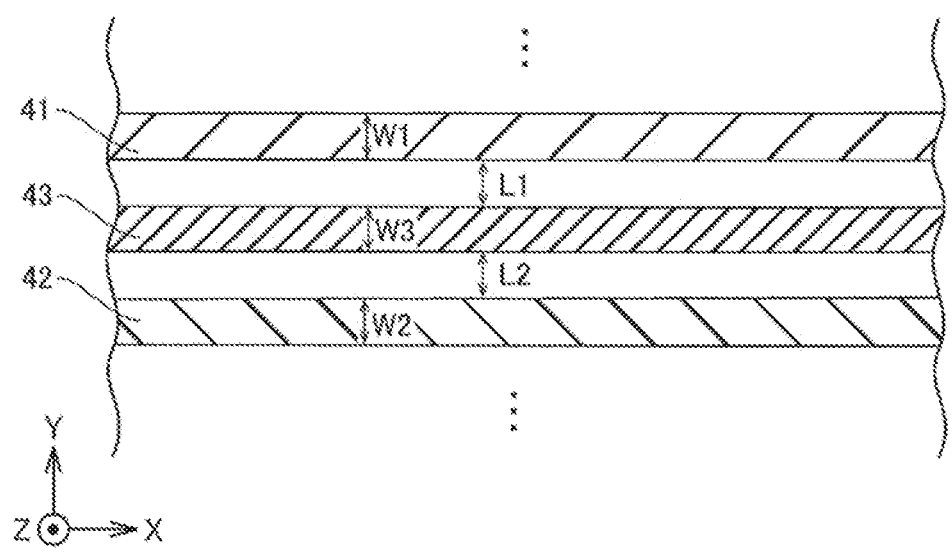
FIG. 6 is a plan view for describing an arrangement of a position sensor wiring line, a pressing force sensor wiring line, and a shield wiring line.

FIG. 6 is a plan view illustrating an arrangement relationship between the position sensor wiring line 41, the pressing force sensor wiring line 42, and the shield wiring line 43. For example, the shield wiring line 43 and the position sensor wiring line 41 are disposed in parallel to each other, and the shield wiring line 43 and the pressing force sensor wiring line 42 are disposed in parallel to each other. Further, a distance L1 between the shield wiring line 43 and the position sensor wiring line 41, and a distance L2 between the shield wiring line 43 and the pressing force sensor wiring line 42 are substantially equal to each other. Further, the position sensor wiring line 41 has a width W1. The pressing force sensor wiring line 42 has a width W2. The shield wiring line 43 has a width W3. The width W3 is equal to each of the width W1 and the width W2. With such a configuration, a difference between a capacitance between the position sensor wiring line 41 and the shield wiring line 43 and a capacitance between the pressing force sensor wiring line 42 and the shield wiring line 43 can be minimized. Note that the distance L1 may be different from the distance L2. Further, in FIG. 6, the width W3 is illustrated as being equal to each of the distance L1 and the distance L2, but the width W3 may be different from each of the distance L1 and the distance L2.

The terminal portion 30 is connected to a controller (not illustrated). Further, the terminal portion 30 is configured to transmit the signal output from the position sensor electrode 21 and the signal output from the pressing force sensor electrode 22 to the controller.

Operation of Touch Panel

Figure 7:
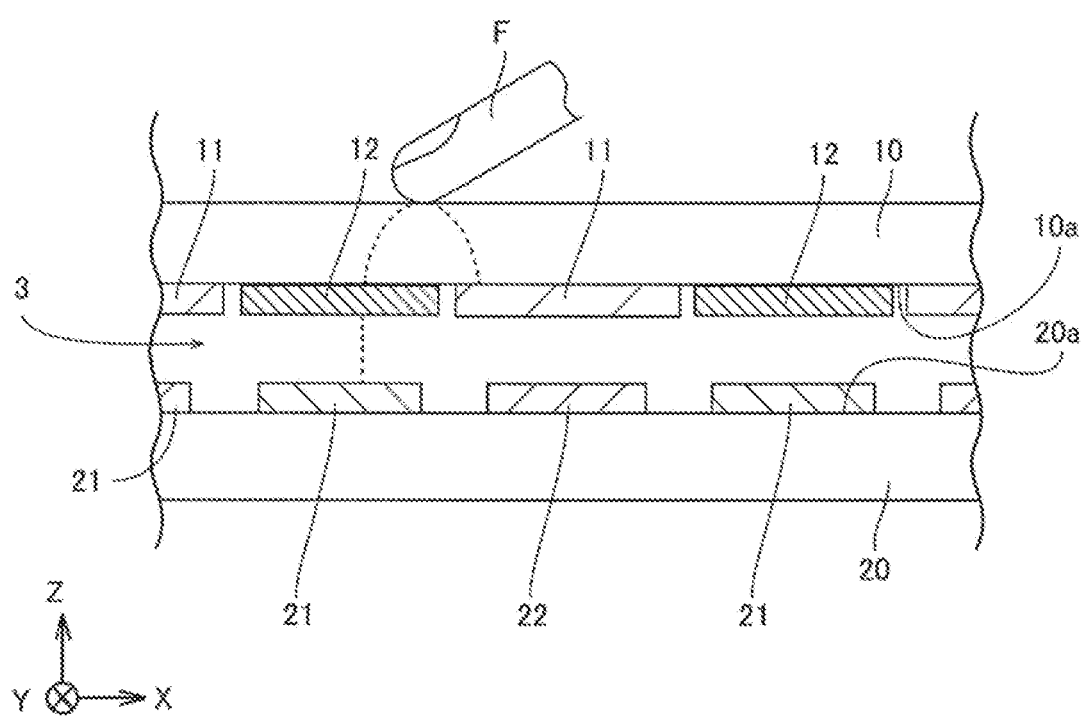
FIG. 7 is a cross-sectional view for describing an operation of the touch panel according to the first embodiment when detecting a position of a pointer.
Figure 8:
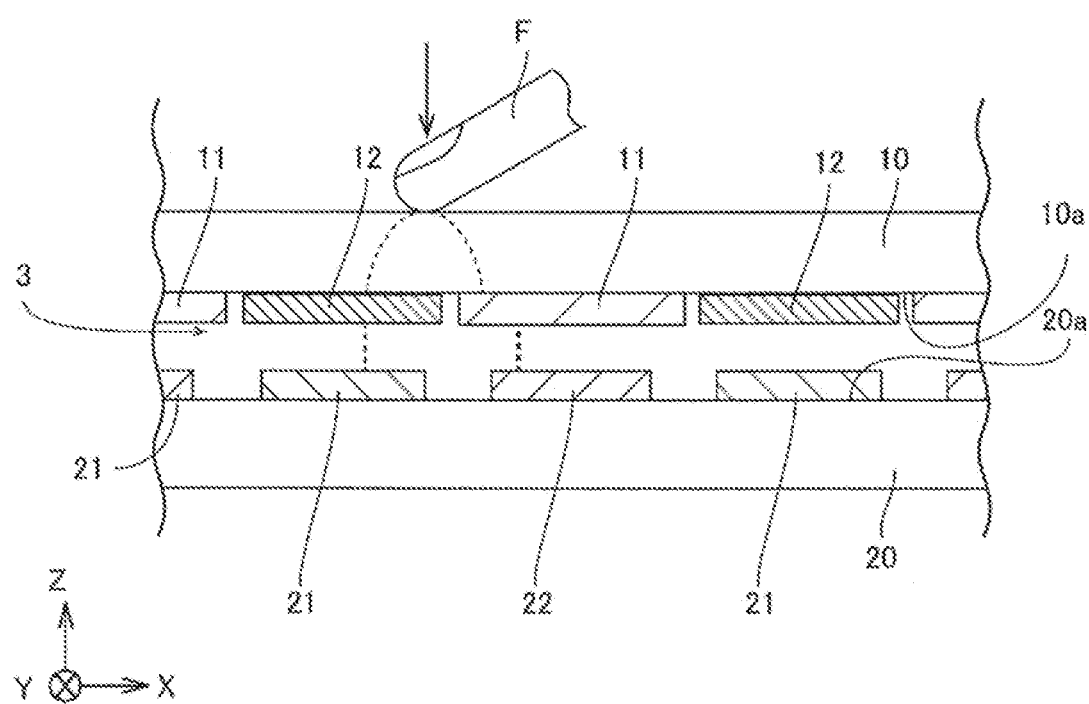
FIG. 8 is a cross-sectional view for describing an operation of the touch panel according to the first embodiment when detecting a pressing force by the pointer.

Next, an operation of the touch panel 1 will be described with reference to FIG. 7 and FIG. 8. FIG. 7 is a cross-sectional view illustrating capacitive coupling with respect to the detection accuracy of the position sensor electrode 21. FIG. 8 is a cross-sectional view illustrating capacitive coupling with respect to the detection accuracy of the pressing force sensor electrode 22. In FIG. 7 and FIG. 8, lines of electric force corresponding to capacitive coupling occurring between the pointer F and the various electrodes and capacitive coupling occurring between the various electrodes are indicated by dashed lines.

As illustrated in FIG. 7, the floating island electrode 12 is capacitively coupled with the position sensor electrode 21. When the pointer F comes into contact with a surface, of the first substrate 10, opposite to the surface 10a, the pointer F is capacitively coupled with each of the drive electrode 11 and the floating island electrode 12. As a result, electrostatic capacitance between the drive electrode 11 and the position sensor electrode 21 decreases via the pointer F and the floating island electrode 12, and this results in a change in a signal detected at the position sensor electrode 21. This change in the signal allows the position of the pointer F to be detected. Note that, at this time, electrostatic capacitance between the drive electrode 11 and the pressing force sensor electrode 22 hardly changes.

Further, as illustrated in FIG. 8, when the first substrate 10 is pressed by the pointer F, a distance between the drive electrode 11 and the pressing force sensor electrode 22 is reduced. As a result, electrostatic capacitance between both the drive electrode 11 and the pressing force sensor electrode 22 increases, and this results in a change in a signal detected at the pressing force sensor electrode 22. This change in the signal allows the magnitude of the pressing force by the pointer F to be detected.

Comparison Result between First Embodiment and Comparative Example

Next, the comparison result between the touch panel 1 according to the first embodiment and a touch panel 50 according to the comparative example will be described with reference to FIG. 9 to FIG. 11. The touch panel 1 according to the first embodiment and the touch panel 50 according to the comparative example differ only with respect to the presence or absence of the shield wiring line 43, and the other configurations thereof are identical to each other. Note that the touch panel 50 according to the comparative example is exemplified in order to describe the effect of the touch panel 1 according to the first embodiment, and the configuration of the touch panel 50 according to the comparative example is not acknowledged as known art herein.

Figure 9:
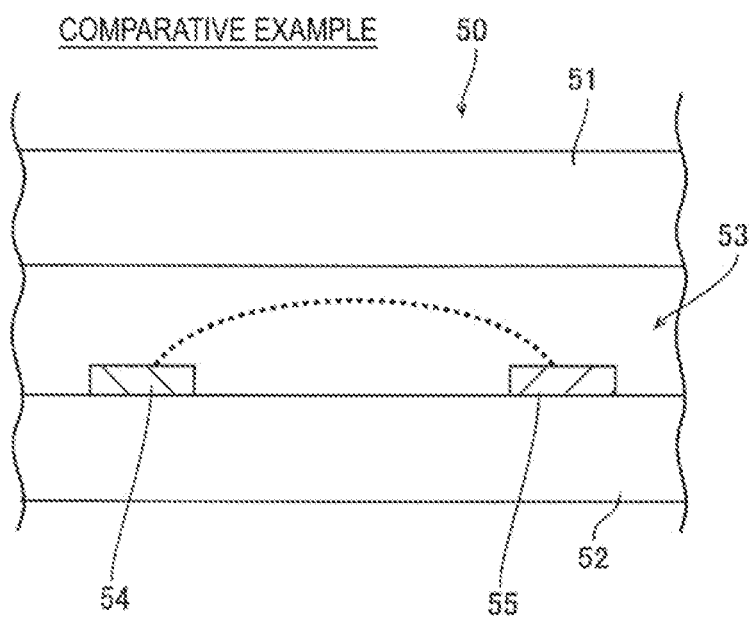
FIG. 9 is a diagram for describing capacitive coupling between a position sensor wiring line and a pressing force sensor wiring line according to a comparative example.
Figure 10:
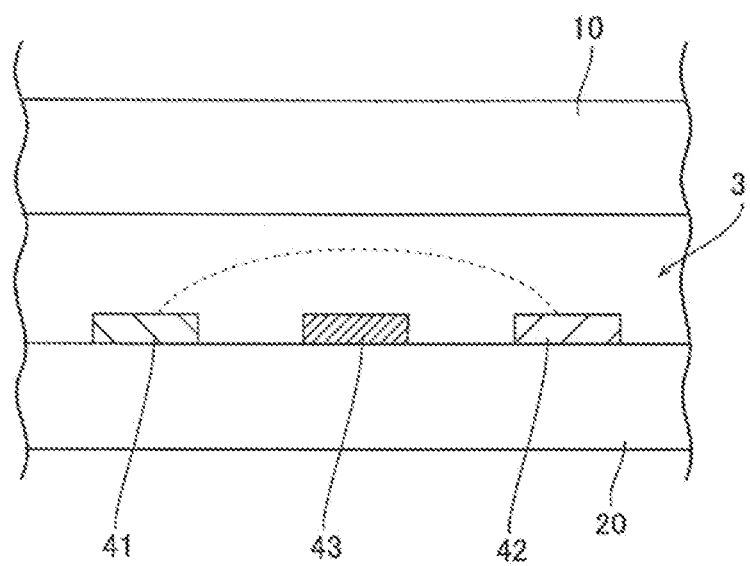
FIG. 10 is a diagram for describing an effect of the shield wiring line according to the first embodiment.

FIG. 9 is a cross-sectional view of a wiring line lead region of the touch panel 50 according to the comparative example. FIG. 10 is a cross-sectional view of the wiring line lead region R2 of the touch panel 1 according to the first embodiment. As illustrated in FIG. 9, the touch panel 50 includes a first substrate 51, a second substrate 52, and a pressure sensitive layer 53. The second substrate 52 is provided with a position sensor wiring line 54 and a pressing force sensor wiring 55, while the shield wiring line 43 is not provided in the touch panel 50 according to the comparative example. Further, as illustrated in FIG. 10, in the touch panel 1 according to the first embodiment, the shield wiring line 43 is disposed between the position sensor wiring line 41 and the pressing force sensor wiring line 42.

Figure 11:
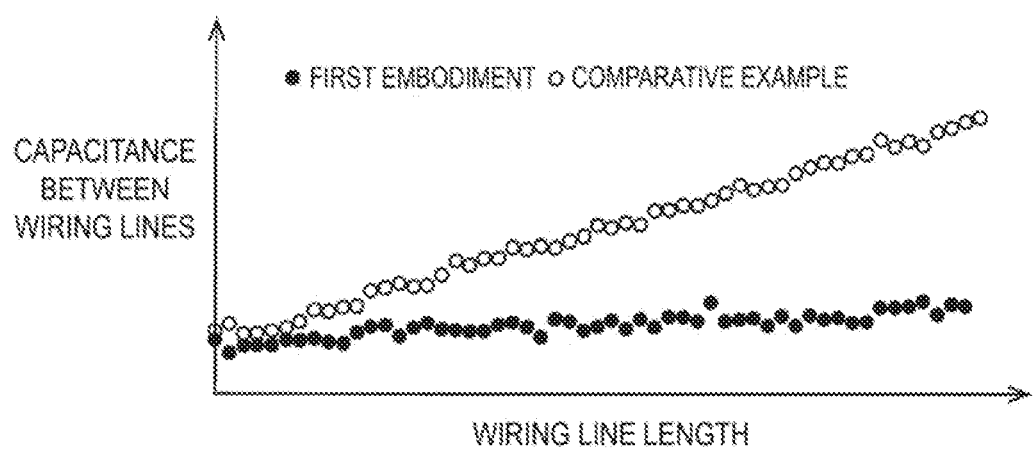
FIG. 11 is a diagram illustrating a comparison result between a touch panel according to the comparative example and the touch panel according to the first embodiment.

FIG. 11 shows measurement results of wiring capacitance between the position sensor wiring line 41 and the pressing force sensor wiring line 42, which are disposed adjacent to each other in the touch panel 1 according to the first embodiment, and wiring capacitance between the position sensor wiring line 54 and the pressing force sensor wiring line 55, which are disposed adjacent to each other in the touch panel 50 according to the comparative example. In these measurements, the wiring capacitance between the plurality of wiring lines (the vertical axis) is plotted for each wiring line length (the horizontal axis). The wiring line length is a distance from the electrode (the sensor active region R1) to the terminal portion.

From the measurement results shown in FIG. 11, it was found that the longer the wiring line length, the more notably the wiring capacitance of the first embodiment becomes smaller than the wiring capacitance of the comparative example. Then, it was found that in the touch panel 1 according to the first embodiment, the wiring capacitance is reduced by 60% or more as a whole, compared with the touch panel 50 according to the comparative example.

As described above, as a result of the touch panel 1 including the shield wiring line 43, the capacitive coupling between the position sensor wiring line 41 and the pressing force sensor wiring line 42 can be inhibited. As a result, since the capacitive coupling, which causes deterioration of the detection accuracy of the position of the pointer F and the magnitude of the pressing force by the pointer F, can be inhibited, the touch panel 1 can accurately detect the position of the pointer F and the magnitude of the pressing force by the pointer F.

Second Embodiment

Next, a second embodiment will be described. Note that, in the following description, when the same reference numerals as in the first embodiment are used, the same configurations as in the first embodiment are indicated, and reference is made to the preceding description unless otherwise described.

Figure 12:
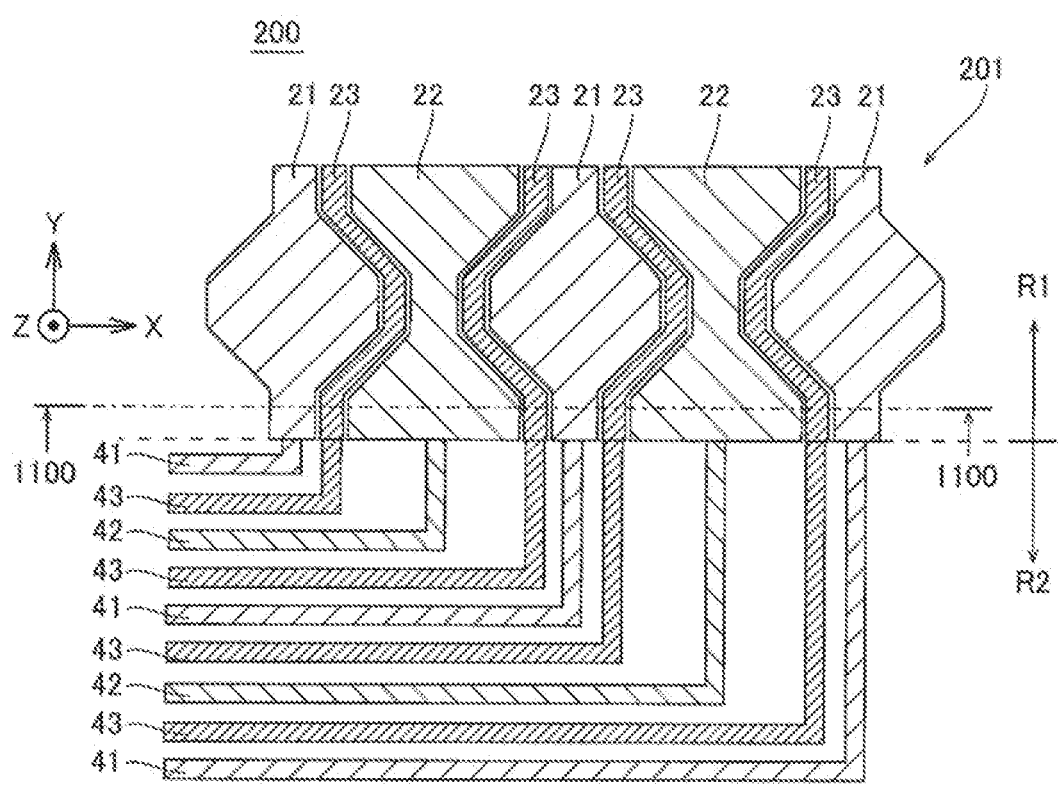
FIG. 12 is a plan view illustrating a configuration of a display device (touch panel) according to a second embodiment.
Figure 13:
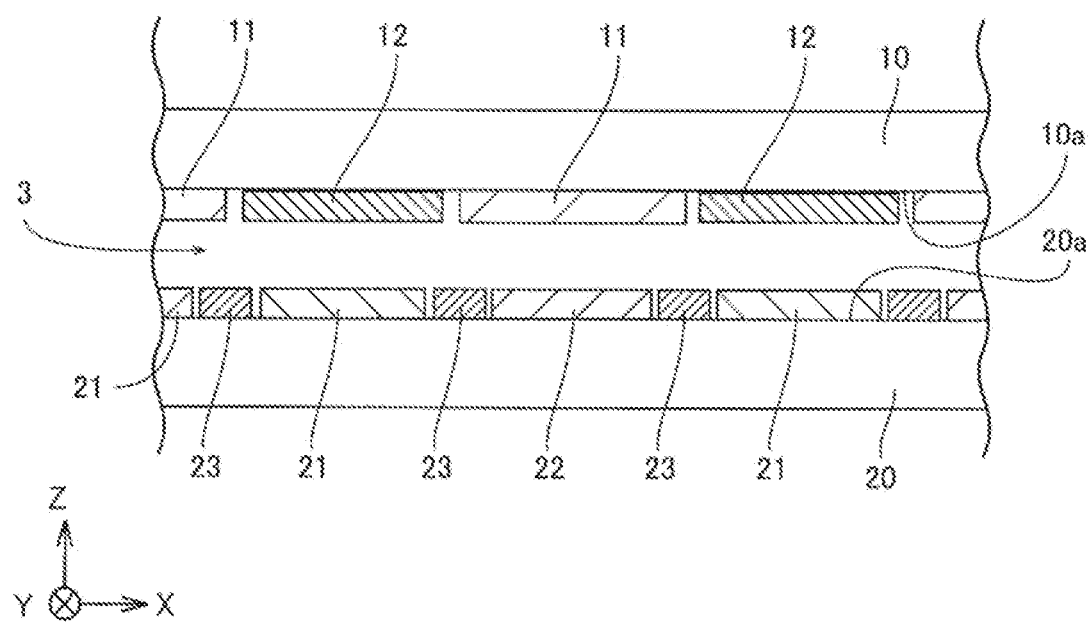
FIG. 13 is a cross-sectional view taken along the line 1100-1100 in FIG. 12.

FIG. 12 and FIG. 13 are diagrams illustrating an overall configuration of a display device 200 (a touch panel 201) according to the second embodiment. FIG. 12 is a plan view illustrating a configuration of electrodes and wiring lines included in the touch panel 201 according to the second embodiment. FIG. 13 is a cross-sectional view illustrating a cross section taken along the line 1100-1100 in FIG. 12.

As illustrated in FIG. 12, shield electrodes 23 are provided in the touch panel 201. The shield electrode 23 is made of an electrically conductive transparent material such as ITO, for example. The ground potential or a potential equal to a potential supplied to the position sensor electrode 21 or the pressing force sensor electrode 22 is supplied to the shield electrode 23, or the shield electrode 23 is in a floating state. As illustrated in FIG. 13, shield electrodes 23 are formed on the surface 20a. Further, each shield electrode 23 is disposed between the position sensor electrode 21 and the pressing force sensor electrode 22. For example, the shield electrode 23 is disposed between the position sensor electrode 21 and the pressing force sensor electrode 22 so as to separate these electrodes from each other. Further, as illustrated in FIG. 13, at least a portion of an end portion of the drive electrode 11 is positioned above the shield electrode 23.

Here, as illustrated in FIG. 12, in the second embodiment, the shield wiring lines 43 are connected to the shield electrodes 23. According to this configuration, if the potential of one of the shield wiring line 43 and the shield electrode 23 is set to a predetermined potential (the ground potential or the potential equal to the potential supplied to the position sensor electrode 21 or the pressing force sensor electrode 22, for example), the potential of the other one of the shield wiring line 43 and the shield electrode 23 can be set to the same potential.

Figure 14:
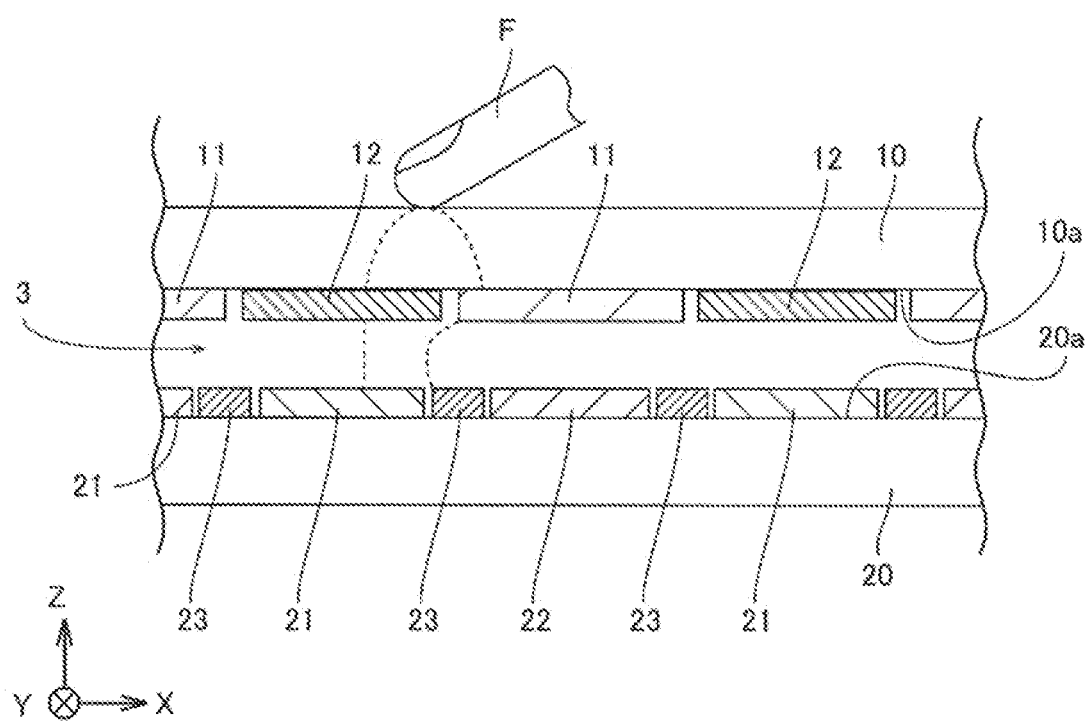
FIG. 14 is a cross-sectional view for describing an operation of the touch panel according to the second embodiment when detecting the position of the pointer.
Figure 15:
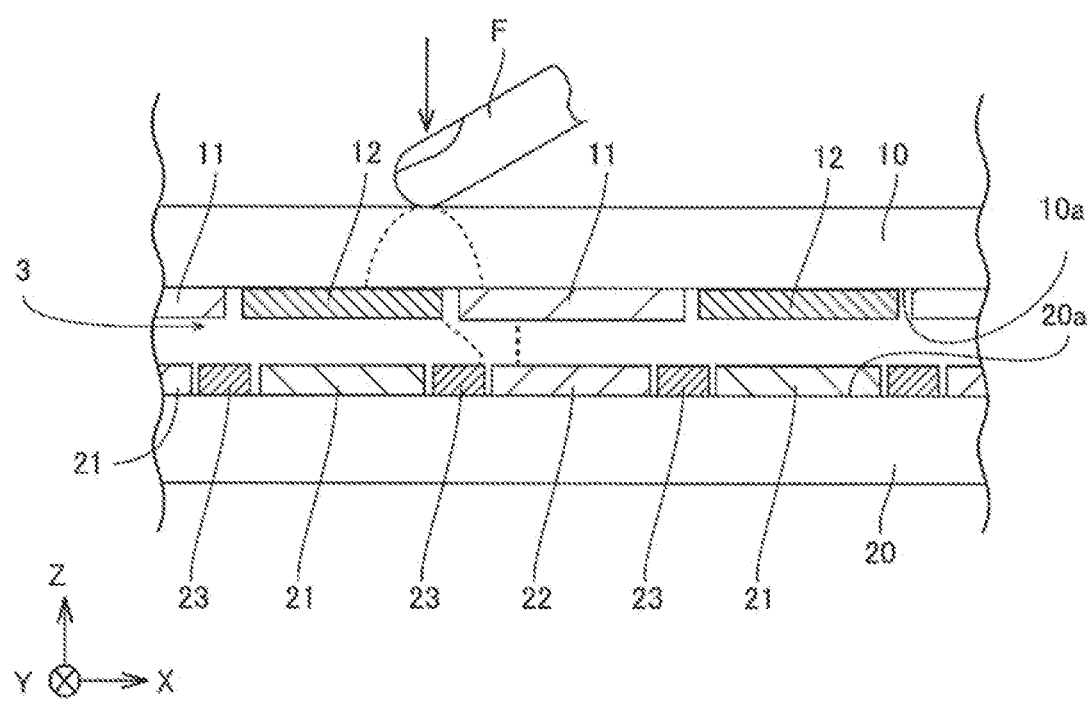
FIG. 15 is a cross-sectional view for describing an operation of the touch panel according to the second embodiment when detecting the pressing force of the pointer.

Next, an operation of the touch panel 201 will be described with reference to the drawings. FIG. 14 is a cross-sectional view illustrating the capacitive coupling in relation to the detection accuracy of the position sensor electrode 21. FIG. 15 is a cross-sectional view illustrating the capacitive coupling in relation to the detection accuracy of the pressing force sensor electrode 22. In FIG. 14 and FIG. 15, the lines of electric force corresponding to the capacitive coupling occurring between the pointer F and the various electrodes and the capacitive coupling occurring between the various electrodes are indicated by dashed lines.

As illustrated in FIG. 14, when the pointer F comes into contact with the surface, of the first substrate 10, opposite to the surface 10a, the pointer F is capacitively coupled with each of the drive electrode 11 and the floating island electrode 12. As a result, the electrostatic capacitance between the drive electrode 11 and the position sensor electrode 21 decreases via the pointer F, and this results in a change in the signal detected at the position sensor electrode 21. This change in the signal allows the position of the pointer F to be detected.

At this time, when the first substrate 10 is pressed by the pointer F, the distance between the drive electrode 11 and the position sensor electrode 21 is reduced. However, since the drive electrode 11 is closer to the shield electrode 23 than to the position sensor electrode 21, the drive electrode 11 is likely to be capacitively coupled with the shield electrode 23. Thus, the electrostatic capacitance between the drive electrode 11 and the position sensor electrode 21 is less likely to increase, and the decrease in electrostatic capacitance between the drive electrode 11 and the position sensor electrode 21 due to the pointer F is less likely to be canceled out. Accordingly, the touch panel 201 can accurately detect the position of the pointer F.

Further, as illustrated in FIG. 15, when the first substrate 10 is pressed by the pointer F, the distance between the drive electrode 11 and the pressing force sensor electrode 22 is reduced. As a result, the electrostatic capacitance between both the drive electrode 11 and the pressing force sensor electrode 22 increases, and this results in a change in the signal detected at the pressing force sensor electrode 22. This change in the signal allows the magnitude of the pressing force by the pointer F to be detected.

At this time, since, on a path from the pointer F to the pressing force sensor electrode 22, the drive electrode 11 is closer to the shield electrode 23 than to the pressing force sensor electrode 22, the drive electrode 11 is likely to be capacitively coupled with the shield electrode 23. Thus, the pointer F is inhibited from being capacitively coupled with each of the drive electrode 11 and the pressing force sensor electrode 22, and this inhibits the electrostatic capacitance between both the electrodes from fluctuating. Accordingly, the touch panel 201 can accurately detect the magnitude of the pressing force by the pointer F.

As described above, since the touch panel 201 is provided with the shield electrodes 23, it is possible to inhibit the capacitive coupling that causes the deterioration of the detection accuracy of the position of the pointer F and the magnitude of the pressing force by the pointer F. Accordingly, the touch panel 201 can accurately detect the position of the pointer F and the magnitude of the pressing force by the pointer F.

Note that a configuration may be adopted in which the potential of the shield electrode 23 is equal to the ground potential or the potential supplied to the position sensor electrode 21 or the pressing force sensor electrode 22. In this case, the effect of the shield electrode 23 inhibiting the capacitive coupling described above can be increased.

Figure 16:
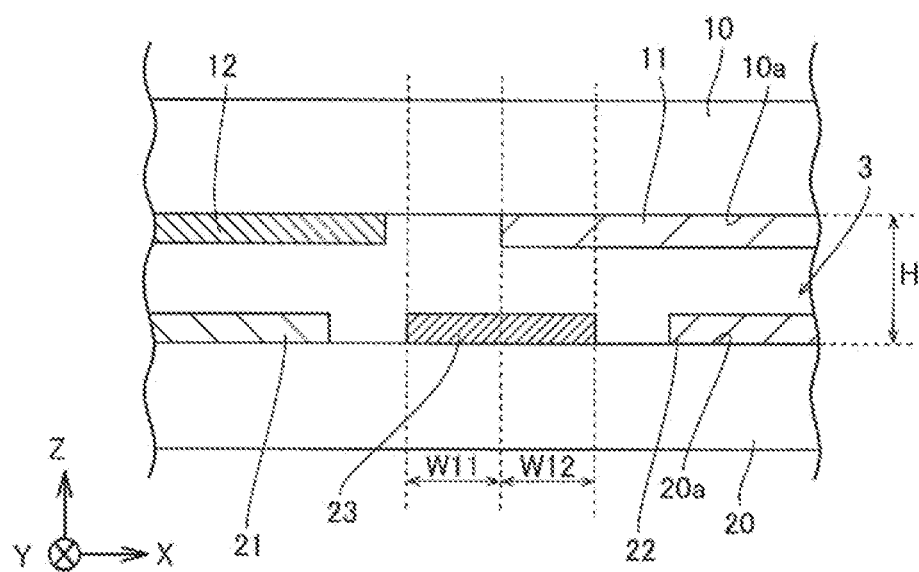
FIG. 16 is a cross-sectional view illustrating a configuration of a shield electrode according to the second embodiment.

Further, from the perspective of increasing the above-described effect of the shield electrode 23 inhibiting the capacitive coupling, the shield electrode 23 is preferably made larger to a predetermined degree. FIG. 16 is a cross-sectional view for describing a suitable size of the shield electrode 23. Hereinafter, as illustrated in FIG. 16, a distance between the surface 10a of the first substrate 10 and the surface 20a of the second substrate 20 is denoted as H. Further, in a plan view, a distance from an end portion of the shield electrode 23 located closer to the position sensor electrode 21 to the end portion of the drive electrode 11 above the shield electrode 23 is denoted as W11. Similarly, in a plan view, a distance from an end portion of the shield electrode 23 located closer to the pressing force sensor electrode 22 to the end portion of the drive electrode 11 above the shield electrode 23 is denoted as W12. Note that H is the distance when the touch panel 1 is not being pressed, and is also the thickness of the pressure sensitive layer 3. Further, in FIG. 16 and the like, the electrodes 11 and 21 to 23 are illustrated such that the thicknesses thereof are enlarged to an extreme extent, but, in reality, since the electrodes 11 and 21 to 23 are extremely thin, H can be viewed as a distance between the drive electrode 11 and the shield electrode 23.

The lines of electric force generated from the pointer F and the various electrodes spread concentrically. Thus, when $W11 \geq H$ is satisfied, the drive electrode 11 can be effectively inhibited from being capacitively coupled with the position sensor electrode 21 beyond the shield electrode 23 (see FIG. 14). Further, when $W12 \geq H$ is satisfied, the pointer F can be effectively inhibited from being capacitively coupled with the pressing force sensor electrode 22 beyond the shield electrode 23 (see FIG. 15).

Note that other configurations and effects of the second embodiment are the same as the configurations and effects of the first embodiment.

Third Embodiment

Next, a third embodiment will be described. Note that, in the following description, when the same reference numerals as in the first or second embodiment are used, the same configurations as in the first or second embodiment are indicated, and reference is made to the preceding description unless otherwise described.

Figure 17:
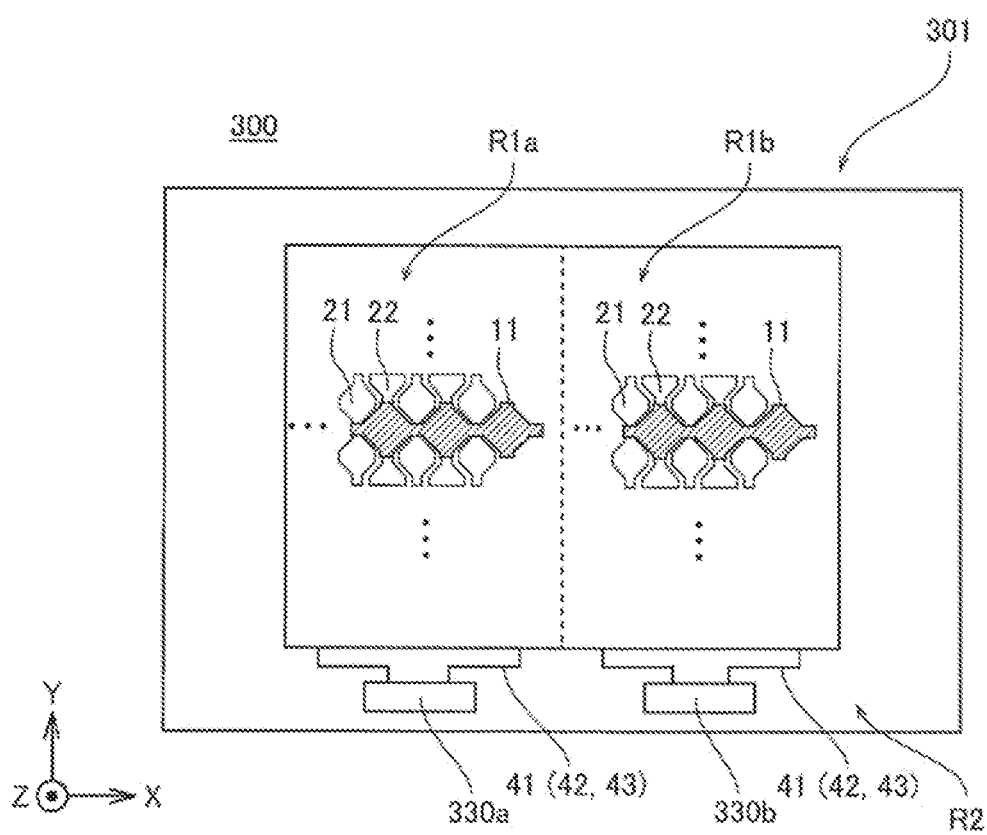
FIG. 17 is a plan view illustrating a configuration of a display device (touch panel) according to a third embodiment.

FIG. 17 is a plan view illustrating an overall configuration of a display device 300 (a touch panel 301) according to the third embodiment. As illustrated in FIG. 17, the touch panel 301 is provided with a first terminal portion 330a and a second terminal portion 330b. The first terminal portion 330a and the second terminal portion 330b are disposed so as to be separated from each other in the X-direction. The first terminal portion 330a is disposed on the negative side in the X-direction with respect to the second terminal portion 330b. The touch panel 301 includes a sensor active region R1a on the negative side in the X-direction and a sensor active region R1b on the positive side in the X-direction.

The position sensor wiring line 41 and the pressing force sensor wiring line 42 respectively connected to the position sensor electrode 21 and the pressing force sensor electrode 22 provided in the sensor active region R1a, and the shield wiring line 43 disposed between the position sensor wiring line 41 and the pressing force sensor wiring line 42 are connected to the first terminal portion 330a. Further, the position sensor wiring line 41 and the pressing force sensor wiring line 42 respectively connected to the position sensor electrode 21 and the pressing force sensor electrode 22 provided in the sensor active region R1b, and the shield wiring line 43 disposed between the position sensor wiring line 41 and the pressing force sensor wiring line 42 are connected to the second terminal portion 330b.

According to the configuration of the third embodiment, the number of wiring lines connected per terminal portion can be reduced compared to when only one terminal portion is provided. As a result, since the number of parallel wiring lines (the position sensor wiring lines 41, the pressing force sensor wiring lines 42, and the shield wiring lines 43) disposed side by side in the Y-direction can be reduced, a frame of the touch panel 301 in the Y-direction can be narrowed.

Note that other configurations and effects of the third embodiment are the same as the configurations and effects of the first embodiment.

Fourth Embodiment

Next, a fourth embodiment will be described. Note that, in the following description, when the same reference numerals as in the first to third embodiments are used, the same configurations as in the first to third embodiments are indicated, and reference is made to the preceding description unless otherwise described.

Figure 18:
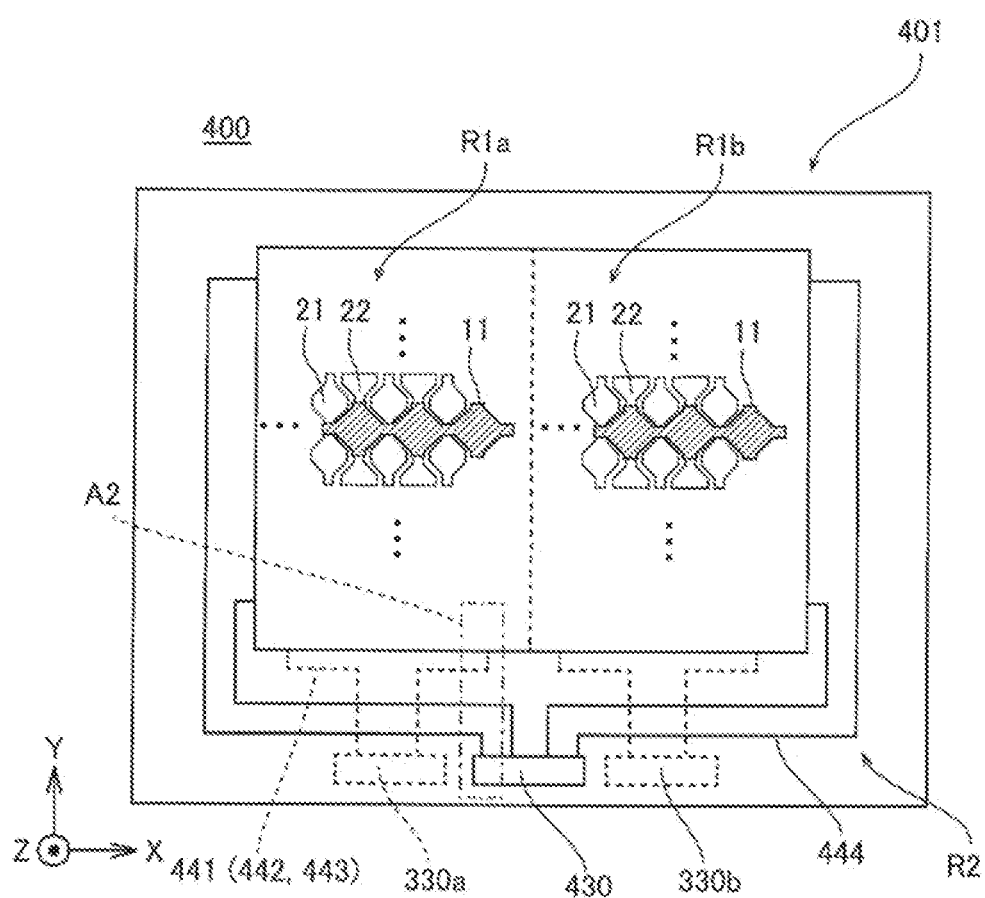
FIG. 18 is a plan view illustrating a configuration of a display device (touch panel) according to a fourth embodiment.

FIG. 18 is a plan view illustrating an overall configuration of a display device 400 (a touch panel 401) according to the fourth embodiment. As illustrated in FIG. 18, the touch panel 401 is provided with the first terminal portion 330a, the second terminal portion 330b, and a drive terminal portion 430. The first terminal portion 330a and the second terminal portion 330b are disposed so as to be separated from each other in the X-direction. The first terminal portion 330a is disposed on the negative side in the X-direction with respect to the second terminal portion 330b.

The drive terminal portion 430 is provided on the surface 10a (see FIG. 4) of the first substrate 10. The drive terminal portion 430 is connected to each of the drive electrodes 11 via a drive wiring line 444. Further, in a plan view, the drive terminal portion 430 is disposed between the first terminal portion 330a and the second terminal portion 330b. Further, the drive terminal portion 430 is provided in a center portion, in the X-direction, of the touch panel 401. According to this configuration, the drive terminal portion 430 can be provided in unused space between the first terminal portion 330a and the second terminal portion 330b, and thus a frame of the touch panel 401 can be reduced. In addition, since distances in the X-direction between the drive terminal portion 430 and the first terminal portion 330a and the second terminal portion 330b can be reduced, the dimension of the touch panel 401 in the X-direction can be reduced.

The drive wiring line 444 is disposed on the surface 10a of the first substrate 10, and in a plan view, the drive wiring line 444 is orthogonal to the position sensor wiring line 41, the pressing force sensor wiring line 42, and the shield wiring line 43. According to this configuration, compared to when the drive wiring line 444 is not orthogonal to (is parallel to) the position sensor wiring line 41, the pressing force sensor wiring line 42, and the shield wiring line 43, capacitive coupling between the drive wiring line 444 and the position sensor wiring line 41 or the pressing force sensor wiring line 42 can be reduced (minimized). Accordingly, the touch panel 401 can even more accurately detect the position of the pointer F and the magnitude of the pressing force by the pointer F.

Figure 19:
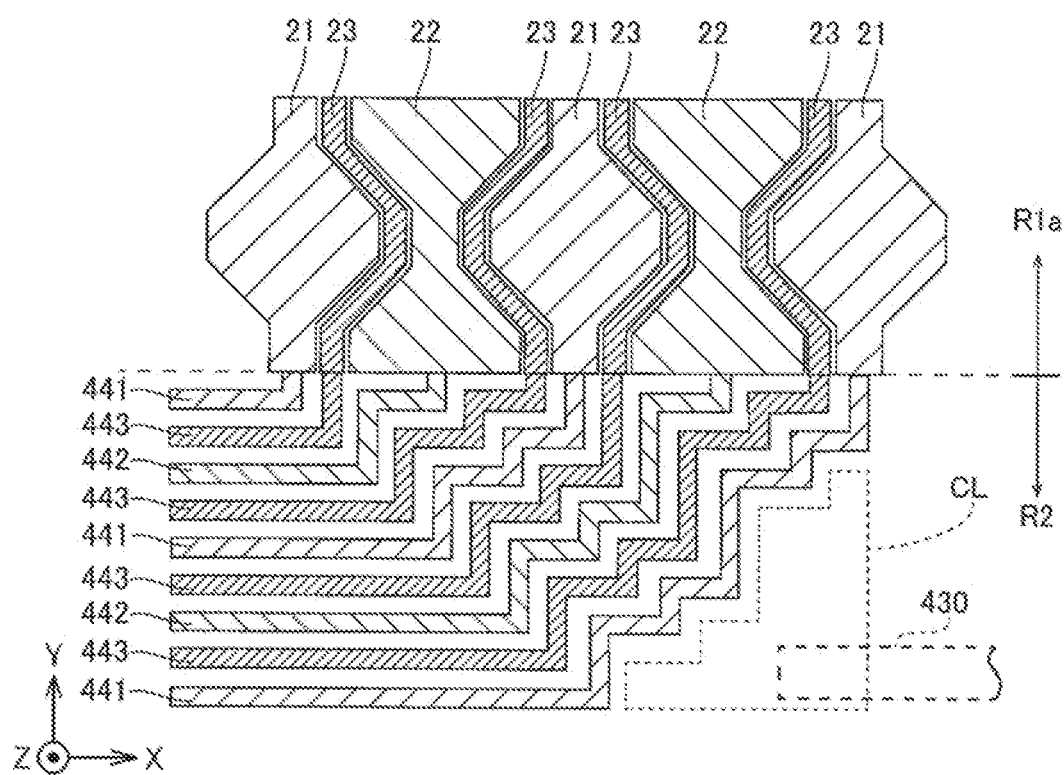
FIG. 19 is a partially enlarged view of a region A2 illustrated in FIG. 18.

FIG. 19 is an enlarged plan view of a region A2 in the touch panel 401 illustrated in FIG. 18. Here, in a plan view, a position sensor wiring line 441, a pressing force sensor wiring line 442, and a shield wiring line 443 each have a recessed step shape (stepped shape) recessed toward the first terminal portion 330a side (the negative side in the X-direction). Further, although not illustrated, each of the position sensor wiring line 441, the pressing force sensor wiring line 442 and the shield wiring line 443, each of which extends from the sensor active region R1b, has a recessed step shape (stepped shape) recessed toward the second terminal portion 330b side (the positive side in the X-direction). According to this configuration, the drive terminal portion 430 can be disposed in a space CL formed as a result of the recessed shape of each of the wiring lines. As a result, the frame of the touch panel 401 can be further reduced by the size equivalent to the space CL, by effectively using the space CL.

Note that other configurations and effects of the fourth embodiment are the same as the configurations and effects of the first embodiment.

MODIFIED EXAMPLES, ETC.

The above-described first to fourth embodiments are merely examples for implementing the disclosure. Accordingly, the disclosure is not limited to the embodiments described above and can be implemented by modifying the embodiments described above as appropriate without departing from the scope of the disclosure.

(1) An example is illustrated above in which the touch panel according to each of the first to fourth embodiments is configured as part of the display device, but the disclosure is not limited to this example. In other words, the touch panel may be configured as a stand-alone device, or the above-described touch panel may be incorporated into a device other than the display device.

(2) In each of the above-described first to fourth embodiments, an example is illustrated in which the floating island electrode is provided in the touch panel, but the disclosure is not limited to this example. In other words, the floating island electrode need not necessarily be provided in the touch panel.

(3) In each of the above-described first to fourth embodiments, an example is illustrated in which the position sensor electrode, the pressing force sensor electrode, the shield electrode, the position sensor wiring line, the pressing force sensor wiring line, and the shield wiring line are made of ITO or mesh metal, but the disclosure is not limited to this example. In other words, the position sensor electrode, the pressing force sensor electrode, the shield electrode, the position sensor wiring line, the pressing force sensor wiring line, and the shield wiring line may each be made of a conductive body other than the ITO and the mesh metal.

(4) In each of the above-described first to fourth embodiments, an example is illustrated in which each of the drive electrode 11, the floating island electrode 12, the position sensor electrode, and the pressing force sensor electrode has a diamond pattern, but these electrodes may have a different shape. For example, each of the drive electrode, the floating island electrode, the position sensor electrode, and the pressing force sensor electrode may have a pattern having a uniform width. However, in a plan view, it is assumed that the drive electrode covers at least a portion of the pressing force sensor electrode, and that at least a portion of an end portion of the drive electrode is positioned above the shield electrode.

Figure 20:
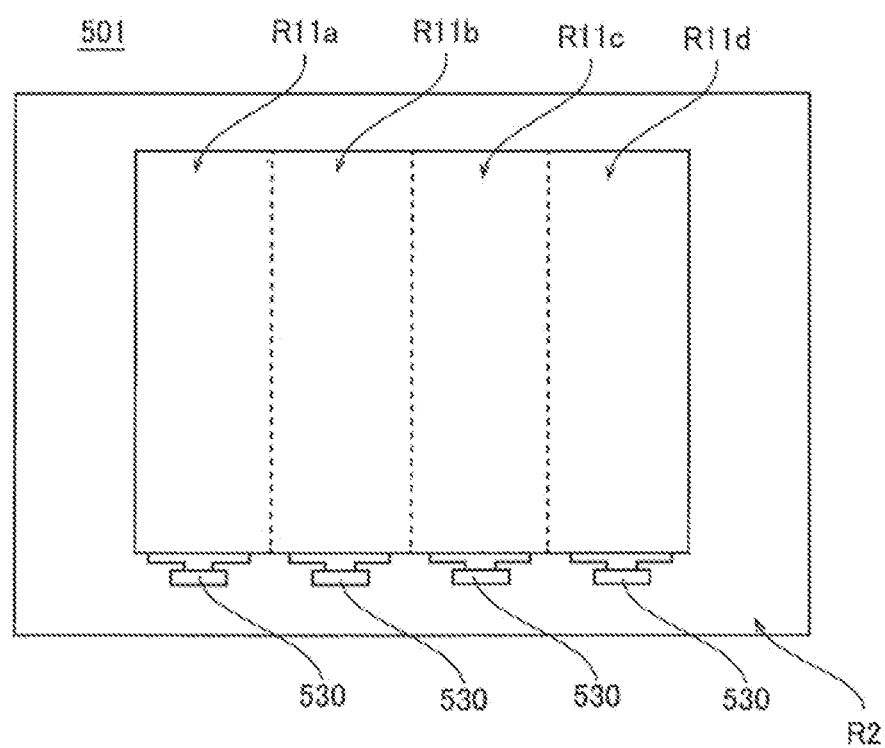
FIG. 20 is a plan view illustrating a configuration of a touch panel according to a first modified example of the first to fourth embodiments.

(5) In each of the first to fourth embodiments, an example is illustrated in which the number of terminal portions to which the position sensor wiring lines and the pressing force sensor wiring lines are connected is one or two, but the disclosure is not limited to this example. For example, in a case in which the sensor active region is divided into four regions as in a touch panel 501 according to a first modified example illustrated in FIG. 20, terminal portions 530 connected to respective sensor active regions (R11a, R11b, R11c, and R11d) may be provided.

Figure 21:
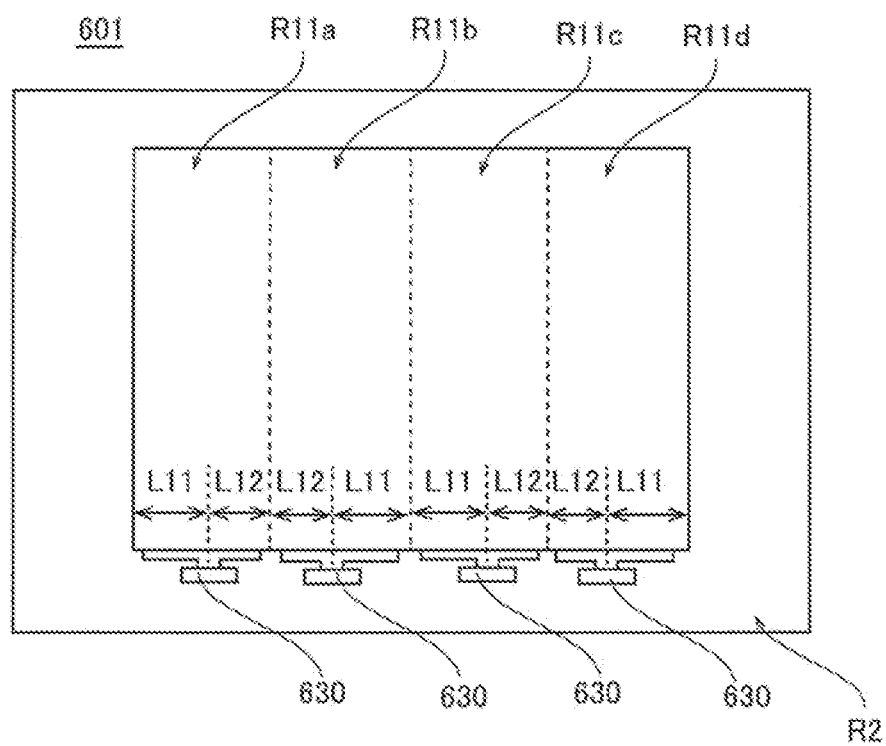
FIG. 21 is a plan view illustrating a configuration of a touch panel according to a second modified example of the first to fourth embodiments.

(6) In each of the first to fourth embodiments, an example is illustrated in which the terminal portion to which the position sensor wiring lines and the pressing force sensor wiring lines are connected is disposed in the center portion, in the X-direction, of the sensor active region, but the disclosure is not limited to this example. For example, as in a touch panel 601 according to a second modified example illustrated in FIG. 21, each of terminal portions 630 may be provided at a position offset to one side from the center portion, in the X-direction, of each of the sensor active regions. For example, when the sensor active region is divided into four regions, the terminal portion 630 may be provided at a position, between one end and the other end in the X-direction, of a first sensor active region, at which a ratio of a portion from the center in the X-direction to the one end with respect to a portion from the center to the other end is 3 to 2. For example, a ratio of a distance L11 from the center, in the X-direction, of the terminal portion 630 to the one end, with respect to a distance L12 from the center to the other end is 3 to 2. Further, between one end and the other end, in the X-direction, of a second sensor active region, which is adjacent to the first sensor active region, the terminal portion 630 may be provided at a position at which the ratio of the portion from the center in the X-direction to the one end with respect to the portion from the center to the other end is 2 to 3. According to this configuration, since two of the terminal portions 630 are disposed in close proximity to each other in the X-direction, a section (a flexible printed circuit board (FPC), for example) that constitutes the terminal portions 630 disposed in close proximity to each other can be downsized.

(7) In each of the above-described first to fourth embodiments, an example is illustrated in which the position sensor wiring line, the pressing force sensor wiring line, and the shield wiring line are formed into an L-shape or a stepped shape in a plan view, but the disclosure is not limited to this example. In other words, the position sensor wiring line, the pressing force sensor wiring line, and the shield wiring line may each be formed into a straight line shape that is not bent.

(8) In each of the above-described first to fourth embodiments, an example is illustrated in which the position sensor wiring lines and the pressing force sensor wiring lines are alternately disposed, but the disclosure is not limited to this example. In other words, the plurality of position sensor wiring lines may be disposed adjacent to each other, and the plurality of pressing force sensor wiring lines may be disposed adjacent to each other.

(9) In the above-described second embodiment, an example is illustrated in which the shield wiring line and the shield electrode are connected to each other, but the disclosure is not limited to this example. In other words, the shield wiring line and the shield electrode need not necessarily be connected to each other.

(10) In the above-described fourth embodiment, an example is illustrated in which the drive wiring line is orthogonal to the position sensor wiring line, the pressing force sensor wiring line, and the shield wiring line in a plan view, but the disclosure is not limited to this example. In other words, in a plan view, the drive wiring line need not necessarily be orthogonal to the position sensor wiring line, the pressing force sensor wiring line and the shield wiring line, and may or may not intersect these wiring lines.

Further, the above-described touch panels and display devices can be described as follows.

A touch panel according to a first configuration includes a first substrate including a first surface, a second substrate including a second surface facing the first surface, a drive electrode formed on the first surface, a position sensor electrode and a pressing force sensor electrode formed on the second surface, a position sensor wiring line configured to connect the position sensor electrode to a sensor terminal portion, a pressing force sensor wiring line configured to connect the pressing force sensor electrode to the sensor terminal portion, and a shield wiring line disposed between the position sensor wiring line and the pressing force sensor wiring line in a plan view of the second substrate (the first configuration).

By including the shield wiring line, the first configuration can inhibit capacitive coupling between the position sensor wiring line and the pressing force sensor wiring line. In this way, by inhibiting the capacitive coupling, which causes a deterioration in the detection accuracy of the position of a pointer and the magnitude of a pressing force by the pointer, the touch panel can accurately detect the position of the pointer and the magnitude of the pressing force by the pointer.

In the first configuration, the touch panel may be configured such that a potential of the shield wiring line is equal to one of a ground potential and a potential of the position sensor wiring line or the pressing force sensor wiring line (a second configuration). According to this configuration, the effects of the shield wiring line inhibiting the capacitive coupling described above can be increased.

In the first or second configuration, the position sensor wiring line and the pressing force sensor wiring line may be alternately disposed side by side on the second surface, and the shield wiring line may be disposed between the position sensor wiring line and the pressing force sensor wiring line, which are alternately disposed side by side on the second surface (a third configuration). According to this configuration, the capacitive coupling can be inhibited in each of the alternately disposed position sensor wiring lines and pressing force sensor wiring lines.

In any one of the first to third configurations, the touch panel may further include a shield electrode formed on the second surface. The shield electrode may be disposed between the position sensor electrode and the pressing force sensor electrode, and in a plan view of the second substrate, the drive electrode may cover at least a portion of the pressing force sensor electrode and at least a portion of an end portion of the drive electrode may be positioned above the shield electrode (a fourth configuration). Here, in the touch panel, when the touch panel is pressed by the pointer, both a distance between the drive electrode and the pressing force sensor electrode and a distance between the drive electrode and the position sensor electrode are reduced. Thus, electrostatic capacitance between the drive electrode and the position sensor electrode increases, and a decrease in electrostatic capacitance due to the capacitive coupling with the pointer is canceled out. As a result, the detection accuracy of the position of the pointer may deteriorate. Further, in the touch panel, as a result of the pointer being capacitively coupled with each of the drive electrode and the position sensor electrode, electrostatic capacitance between both the electrodes fluctuates. The magnitude of the pressing force is detected on the basis of the magnitude of the electrostatic capacitance in accordance with the distance between the drive electrode and the pressing force sensor electrode. Thus, as a result of the pointer causing the electrostatic capacitance between the drive electrode and the pressing force sensor electrode to fluctuate, the detection accuracy of the magnitude of the pressing force may deteriorate. In contrast, according to the fourth configuration, by including the shield electrode, the touch panel can inhibit the capacitive coupling that causes the deterioration in the detection accuracy of the position of the pointer and the magnitude of the pressing force by the pointer.

In the fourth configuration, the shield wiring line may be connected to the shield electrode (a fifth configuration). According to this configuration, if one of the shield wiring line and the shield electrode is set to a predetermined potential (a ground potential, for example), the other one of the shield wiring line and the shield electrode can be set to the same potential.

In any one of the first to fifth configurations, the sensor terminal portion may be provided corresponding to each of a plurality of segmented regions that are segmented to be disposed side by side in a first direction on the second surface, the position sensor wiring line and the pressing force sensor wiring line may be disposed side by side in a second direction that is one of intersecting and orthogonal to the first direction on the second surface, and the shield wiring line may be disposed between the position sensor wiring line and the pressing force sensor wiring line, which are disposed side by side in the second direction (a sixth configuration). According to this configuration, the number of wiring lines arranged side by side in the second direction can be reduced compared to a case in which only the one sensor terminal portion is provided. As a result, a frame portion, of the touch panel, on which the wiring lines are disposed can be reduced.

In the sixth configuration, the touch panel may further include a drive wiring line connected to the drive electrode and formed at the first surface, and a drive terminal portion connected to the drive wiring line. In a plan view of the first substrate and the second substrate, the drive terminal portion may be disposed between the sensor terminal portions disposed corresponding to each of the plurality of segmented regions (a seventh configuration). According to this configuration, compared with a case in which nothing is present in a region (space) between the sensor terminal portions, the region between the sensor terminal portions can be effectively utilized, and the touch panel can thus be downsized.

In the seventh configuration, in a plan view of the first substrate and the second substrate, the drive wiring line may be orthogonal to at least one of the position sensor wiring line and the pressing force sensor wiring line (an eighth configuration). According to this configuration, capacitive coupling between the drive wiring line, and at least one of the position sensor wiring line and the pressing force sensor wiring line can be minimized.

In any one of the first to eighth configurations, each of the position sensor wiring line and the pressing force sensor wiring line may be configured to have a stepped shape that is recessed toward the sensor terminal portion in a plan view of the second substrate, and the shield wiring line may be formed between the position sensor wiring line and the pressing force sensor wiring line, the position sensor wiring line and the pressing force sensor wiring line each having the stepped shape (a ninth configuration). According to this configuration, since other members can be disposed in a region (space) generated by each of the position sensor wiring line and the pressing force sensor wiring line being recessed toward the sensor terminal portion side, the touch panel can be even further downsized.

A display device according to a tenth configuration may include the touch panel according to any one of the first to ninth configurations, and a display configured to display an image, and the touch panel may be disposed on a display surface of the display (the tenth configuration). According to this configuration, it is possible to provide the display device provided with the touch panel capable of accurately detecting the position of the pointer and the magnitude of the pressing force by the pointer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A touch panel comprising:
a first substrate including a first surface;
a second substrate including a second surface facing the first surface;
a drive electrode formed on the first surface;
a position sensor electrode and a pressing force sensor electrode formed on the second surface;
a position sensor wiring line configured to connect the position sensor electrode to a sensor terminal portion;
a pressing force sensor wiring line configured to connect the pressing force sensor electrode to the sensor terminal portion;
a shield wiring line disposed between the position sensor wiring line and the pressing force sensor wiring line in a plan view of the second substrate; and
a shield electrode formed on the second surface,
wherein the shield electrode is disposed between the position sensor electrode and the pressing force sensor electrode, and
in the plan view of the second substrate, the drive electrode covers at least a portion of the pressing force sensor electrode and at least a portion of an end portion of the drive electrode is positioned above the shield electrode.

2. The touch panel according to claim 1,
wherein a potential of the shield wiring line is equal to one of a ground potential and a potential of the position sensor wiring line or the pressing force sensor wiring line.

3. The touch panel according to claim 1,
wherein the position sensor wiring line and the pressing force sensor wiring line are alternately disposed side by side on the second surface, and
the shield wiring line is disposed between the position sensor wiring line and the pressing force sensor wiring line, which are alternately disposed side by side on the second surface.

4. The touch panel according to claim 1,
wherein the shield wiring line is connected to the shield electrode.

5. A display device comprising:
the touch panel according to claim 1; and
a display configured to display an image,
wherein the touch panel is disposed on a display surface of the display.

6. A touch panel comprising:
a first substrate including a first surface;
a second substrate including a second surface facing the first surface;
a drive electrode formed on the first surface;

a position sensor electrode and a pressing force sensor electrode formed on the second surface;

a position sensor wiring line configured to connect the position sensor electrode to a sensor terminal portion;

a pressing force sensor wiring line configured to connect the pressing force sensor electrode to the sensor terminal portion; and a shield wiring line disposed between the position sensor wiring line and the pressing force sensor wiring line in a plan view of the second substrate, wherein a plurality of the sensor terminal portions is provided, each of the plurality of sensor terminal portions corresponding to each of a plurality of segmented regions that is segmented to be disposed side by side in a first direction on the second surface, the position sensor wiring line and the pressing force sensor wiring line are disposed side by side in a second direction that is one of intersecting and orthogonal to the first direction on the second surface, and the shield wiring line is disposed between the position sensor wiring line and the pressing force sensor wiring line, which are disposed side by side in the second direction.

7. The touch panel according to claim 6, further comprising:

a drive wiring line connected to the drive electrode and formed on the first surface; and a drive terminal portion connected to the drive wiring line, wherein, in a plan view of the first substrate and the second substrate, the drive terminal portion is disposed between the plurality of sensor terminal portions disposed corresponding to each of the plurality of segmented regions.

8. The touch panel according to claim 7, wherein, in the plan view of the first substrate and the second substrate, the drive wiring line is orthogonal to at least one of the position sensor wiring line and the pressing force sensor wiring line.

9. The touch panel according to claim 6, wherein a potential of the shield wiring line is equal to one of a ground potential and a potential of the position sensor wiring line or the pressing force sensor wiring line.

10. The touch panel according to claim 6, wherein the position sensor wiring line and the pressing force sensor wiring line are alternately disposed side by side on the second surface, and the shield wiring line is disposed between the position sensor wiring line and the pressing force sensor wiring line, which are alternately disposed side by side on the second surface.

11. A touch panel comprising:

a first substrate including a first surface;

a second substrate including a second surface facing the first surface;

a drive electrode formed on the first surface;

a position sensor electrode and a pressing force sensor electrode formed on the second surface;

a position sensor wiring line configured to connect the position sensor electrode to a sensor terminal portion;

a pressing force sensor wiring line configured to connect the pressing force sensor electrode to the sensor terminal portion; and a shield wiring line disposed between the position sensor wiring line and the pressing force sensor wiring line in a plan view of the second substrate, wherein each of the position sensor wiring line and the pressing force sensor wiring line has a stepped shape that is recessed toward the sensor terminal portion in the plan view of the second substrate, and the shield wiring line is formed between the position sensor wiring line and the pressing force sensor wiring line, the position sensor wiring line and the pressing force sensor wiring line each having the stepped shape.

12. A display device comprising:

the touch panel according to claim 6; and a display configured to display an image, wherein the touch panel is disposed on a display surface of the display.

13. The touch panel according to claim 11, wherein a potential of the shield wiring line is equal to one of a ground potential and a potential of the position sensor wiring line or the pressing force sensor wiring line.

14. The touch panel according to claim 11, wherein the position sensor wiring line and the pressing force sensor wiring line are alternately disposed side by side on the second surface, and the shield wiring line is disposed between the position sensor wiring line and the pressing force sensor wiring line, which are alternately disposed side by side on the second surface.

15. The touch panel according to claim 11, further comprising:

a shield electrode formed on the second surface, wherein the shield electrode is disposed between the position sensor electrode and the pressing force sensor electrode, and in the plan view of the second substrate, the drive electrode covers at least a portion of the pressing force sensor electrode and at least a portion of an end portion of the drive electrode is positioned above the shield electrode.

16. The touch panel according to claim 15, wherein the shield wiring line is connected to the shield electrode.

17. The touch panel according to claim 11, wherein a plurality of the sensor terminal portions is provided, each of the plurality of sensor terminal portions corresponding to each of a plurality of segmented regions that is segmented to be disposed side by side in a first direction on the second surface, the position sensor wiring line and the pressing force sensor wiring line are disposed side by side in a second direction that is one of intersecting and orthogonal to the first direction on the second surface, and the shield wiring line is disposed between the position sensor wiring line and the pressing force sensor wiring line, which are disposed side by side in the second direction.

18. The touch panel according to claim 17, further comprising:

a drive wiring line connected to the drive electrode and formed on the first surface; and a drive terminal portion connected to the drive wiring line, wherein, in a plan view of the first substrate and the second substrate, the drive terminal portion is disposed between the plurality of sensor terminal portions disposed corresponding to each of the plurality of segmented regions.

19. The touch panel according to claim 18, wherein, in the plan view of the first substrate and the second substrate, the drive wiring line is orthogonal to at least one of the position sensor wiring line and the pressing force sensor wiring line.

20. A display device comprising:
the touch panel according to claim 1; and
a display configured to display an image,
wherein the touch panel is disposed on a display surface of the display.

* * * * *